Patented July 3, 1928.

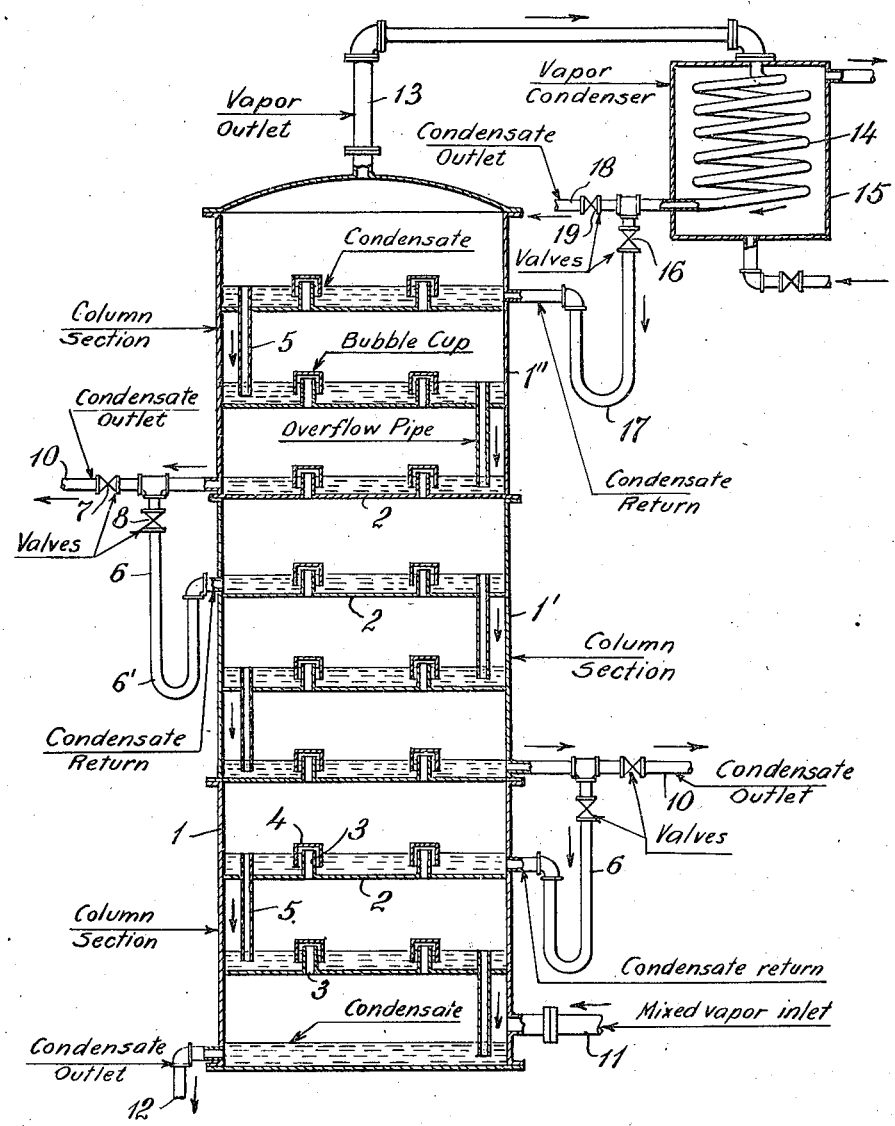

1,676,232

UNITED STATES PATENT OFFICE.

LOUIS WEISBERG, OF GRANTWOOD, NEW JERSEY, ASSIGNOR TO THE BARRETT COMPANY, A CORPORATION OF NEW JERSEY.

FRACTIONAL CONDENSATION OF MIXED VAPORS.

Application filed November 29, 1921, Serial No. 518,544. Renewed March 23, 1927.

This invention relates to new and useful improvements in the fractional condensation of mixed vapors. It comprises a process in which the mixed vapors flow in counter-current direction to the condensate and in intimate contact with it, thus bringing the condensate into heat interchanging relationship with the vapor, whereby the less volatile components are condensed from the vapor and the more volatile components in the condensate are revaporized; and in which the resulting vapors are then completely condensed, part of the condensate produced from the complete condensation being employed in the above described heat interchanging step; and in which the desired fractions are obtained by withdrawing suitable portions of the condensate at intervals when the said condensate has attained the proper composition. The invention further comprises a combination of apparatus elements whereby the above described process may be carried out, namely, a suitable number of column or tower sections which are so arranged that the mixed vapors and the condensate flow through them in series but in counter-current direction to each other, thus bringing the heavier condensate and mixed vapors into heat interchanging relationship; a cooling means to produce complete condensation of the vapors issuing from the furthermost tower or column section, to which section a suitable part of the condensate produced by the cooling means is returned; and means of dividing the condensate leaving the condenser and that leaving each section into two suitable portions, one of which is delivered to the next section in series, and the other of which is a desired fraction of the condensate and is removed to a suitable container therefor. A means of dividing the condensate is not required for the condensate leaving the section in which the mixed vapors first enter. The invention further comprises certain steps and combinations of steps of the process, and certain combinations and arrangements of the apparatus, all as are more fully set forth hereinafter and as claimed.

A particular object of this invention is to obtain in a single apparatus and with a continuous process an efficient and economical separation of the complex mixed vapor produced by the distillation of coal tar in pipe stills. In this method of distillation, tar is circulated under pressure through heated pipes or coils which are set within a furnace or other heating means, and from these pipes is delivered into an expansion chamber where the pressure is released and vaporization of a greater or lesser part of the tar is effected. This method of distillation is continuous in operation, economical in fuel, and increases the yield of desirable products, but requires to be combined with an effective means of separating the vapors released in the expansion chamber into useful fractions. It is important that the fractional condensing apparatus should be able to produce fractions which are themselves distillable within a relatively fixed temperature range, regardless of variations in the rate at which tar is being pumped through the pipe still or even of variations in the character of the tar itself. It is also important that different fractions should be obtainable at will from the same apparatus and the same tar.

I will now proceed to describe my invention more in detail, with particular reference to the accompanying drawing illustrative of certain embodiments of the apparatus of the invention, in which the novel process of this invention can be practiced, it being intended and understood that the invention will be illustrated by, but is not limited to, the specific embodiments of the diagrammatic sketch so illustrated and described. This scheme of fractional condensation is applicable to complicated vapor mixtures such as are produced in the distillation of coal tar or other like complex mixtures.

The drawing is a vertical section through an apparatus for carrying out the invention. In the drawing, reference characters 1, 1', and 1'' indicate column sections which are preferably circular in cross-section and are preferably arranged vertically one above the other, so that the liquid will flow from one into the next lower one by gravity. These sections are provided with the usual plates 2 having tubes 3 and bubble caps 4. The plates in the individual column sections may be connected by the usual overflow pipes 5, and the space above the lowest plate 2 of one section is connected by an external pipe 6, provided with a vapor seal 6', with a space above the upper plate 2 of the next lower section. The pipe 6 is provided with valves 7 and 8 so that the proportion of material withdrawn from one section and introduced into a lower section can be varied, the remainder passing out through the pipe 10. An inlet pipe 11 for the vapors enters near the lower end of the column, and an outlet pipe 12 for condensate is also located near the bottom of the column. The upper end of the column is provided with a pipe 13 which leads to a spiral coil 14 in the condenser 15. The lower end of the spiral coil 14 is connected through a valve 16 and a vapor seal 17 to the space above the uppermost plate of the column, and a pipe 18 having a valve 19 leads to a storage tank, not shown.

The operation is as follows:

Mixed vapors are introduced through the pipe 11 and pass upwardly through the tubes 3, bubbling through the liquid and the plates 2, being dephlegmated therethrough. The vapors that pass out through the pipe 13 are condensed in the coil 14, and a predetermined portion of the same is returned through the vapor seal 17 to the uppermost plate and thus passes downwardly through the overflow pipes 5 to the bottom plate of the section 1″, from whence a predetermined amount is withdrawn through the pipe 6 to the next section, the remainder passing out through the pipe 10 to a storage tank. This is repeated in the other section, the final condensate being withdrawn through the pipe 12. In this way the condensates collected from the respective pipes 18, the several pipes 10 and the pipe 12 will each have a boiling point within a very narrow range.

It is evident that the composition and boiling range of the different fractions may be varied by properly adjusting the quantity of condensate entering the top of each column section. In any event, the quantity entering the top section will be greatest and will decrease successively in the lower sections. The heat content of the vapors will remain the same until they pass into the condenser, except for losses due to radiation and to the sensible heat of the oils withdrawn at the lower sections.

The means of dividing the liquid at the various points may be of any convenient type without departing from the scope of this invention. Such means may, moreover, be provided with devices for automatic control so that fractions of the same boiling range will be delivered regardless of variations in operating conditions of the pipe still.

In the claims when the term "column section" is mentioned, I mean any device or apparatus in which fractional interchange can take place between a descending liquid and an ascending vapor.

I claim:

1. The process of fractionally condensing mixed vapors, which comprises introducing the vapors into a fractioning device consisting of a series of column sections arranged vertically, condensing the total vapors issuing from the uppermost section, separating a portion of this condensate and returning the remainder to the uppermost section, withdrawing the total condensate from the lower portion of each section, and in every section except the one in the lowest position, separating a portion of the condensate, and returning the remainder to the section next below.

2. In a device for fractionally condensing mixed vapors, a plurality of column sections arranged consecutively in vertical series, means for introducing mixed vapors into the lower part of the section in the lowest position, means for condensing the total vapors issuing from the uppermost section, means for returning a predetermined portion of this condensate to the said uppermost section, means at the bottom of each column section for removing the liquid condensate from that section, and means for returning a predetermined portion of this condensate to the section next below, except in the case of the section in the lowest position.

3. In the art of fractionally distilling a composite liquid involving interchange between rising vapors and descending refluxing liquid, the method which comprises removing a predetermined percentage of the total descending liquid reflux as a desired fraction, utilizing the remainder as refluxing liquid in its further descent in fractionating relation to rising vapors, and maintaining said percentage substantially constant irrespective of variations in the rate of flow of said vapors.

4. In the art of fractionally distilling a composite liquid involving interchange between rising vapors and descending refluxing liquid, the method which comprises dividing the total liquid reflux at a predetermined point in its descent into streams bearing a fixed ratio to each other, and utilizing one of said streams as reflux in its further descent in fractionating relation to rising vapors.

5. In the art of fractionally distilling composite liquids, the method which comprises drawing off and condensing vapors of the lowest boiling point fraction, returning a portion of the condensate as descending reflux in fractionating relation to rising vapors, at each of one or more predetermined points in the descent of the refluxing liquid removing a predetermined percentage of the total thereof, utilizing the remainder as refluxing liquid in its further descent in fractionating relation to rising vapors, and maintaining said percentage substantially constant irrespective of variations in the rate of flow of the total reflux liquid.

6. In the art of fractionally distilling composite liquids, the method which comprises drawing off the condensing vapors of the lowest boiling point fraction, returning a portion of the condensate as descending reflux in fractionating relation to rising vapors, at each of one or more predetermined points in the descent of the refluxing liquid dividing the total liquid reflux in its descent into streams bearing a fixed ratio to each other, and utilizing one of said streams as reflux in its further descent in fractionating relation to rising vapors.

7. In the art of fractionally distilling a composite liquid involving interchange between rising vapors and descending refluxing liquid, the step which comprises maintaining substantially constant the ratio of the quantity of rising vapors to the quantity of descending refluxing liquid at each successive region in the descent thereof.

8. In the art of fractionally distilling a composite liquid involving interchange between rising vapors and descending refluxing liquid, the step which comprises maintaining substantially constant, notwithstanding variations in the rate of input of the material to be fractionated, the ratio of the quantity of rising vapors to the quantity of descending refluxing liquid at each successive region in the descent thereof.

9. Apparatus for fractionally distilling a composite liquid comprising a fractionating column, means for introducing the material to be fractionated into said column, means for introducing into said column refluxing liquid, means for withdrawing vapor from the column, means for dividing at a point between the top and bottom of said column the total refluxing liquid into streams whose magnitudes bear a substantially fixed ratio to each other, means for withdrawing one of said streams, and means for directing the other of said streams to operate as refluxing liquid in its further descent in fractionating relation to rising vapors.

10. Apparatus for fractionally distilling a composite liquid comprising a fractionating column, means for introducing the material to be fractionated into said column, means for withdrawing vapors of the lowest boiling point constituents, means for condensing vapors, means for returning a substantially fixed percentage of the condensate into said column as refluxing liquid, and means intermediate the top and bottom of said column for removing a substantially fixed percentage of the total descending refluxing liquid.

11. In the art of fractionally distilling a composite liquid involving interchange between rising vapors and descending reflux liquid, the method which comprises removing a portion of the total descending reflux liquid at a predetermined point, and maintaining substantially constant the ratio of the quantity of liquid so removed to the total of the reflux liquid irrespective of variations in the rate of flow of the total reflux liquid.

12. In the art of fractionally distilling composite liquid involving interchange between rising vapors and descending reflux liquid, the method which comprises removing a portion of the total descending reflux liquid at a predetermined point, and maintaining substantially constant the ratio of the quantity of liquid so removed to the total of the reflux liquid irrespective of variations in the rate of flow of the rising vapors.

13. In the art of fractionally distilling a composite liquid involving interchange between rising vapors and descending reflux liquid, the method which comprises condensing vapors, dividing the condensate into streams whose rates of flow bear a substantially fixed relation to each other, returning one of the streams as reflux liquid, removing a portion of the total descending reflux liquid at a predetermined point, and maintaining substantially constant the ratio of the quantity of liquid so removed to the total reflux liquid irrespective of variations in the rate of flow of the rising vapors.

In testimony whereof I affix my signature.

LOUIS WEISBERG.